United States Patent [19]

Bafaro

[11] 4,386,311
[45] May 31, 1983

[54] DUAL SLOPE PULSE WIDTH MODULATION REGULATOR AND CONTROL SYSTEM

[75] Inventor: Michael P. Bafaro, Schaumburg, Ill.

[73] Assignee: Motorola Inc., Schaumburg, Ill.

[21] Appl. No.: 300,156

[22] Filed: Sep. 8, 1981

[51] Int. Cl.³ .............................................. G05F 1/46
[52] U.S. Cl. ..................................... 323/271; 363/21; 363/71; 363/97
[58] Field of Search ................ 307/296, 297; 323/267, 323/271, 283; 363/21, 41, 71, 97

[56] References Cited

U.S. PATENT DOCUMENTS 4,322,785 3/1982 Walker ................................... 363/21

OTHER PUBLICATIONS

"Motorola Linear Integrated Circuits" handbook, published 1979, pp. 4-107 to 4-125 and 6-44 to 6-50.
"Signetics Analog Data Manual 1979" published 1979, pp. 110 to 117.

Primary Examiner—William M. Shoop
Attorney, Agent, or Firm—Phillip H. Melamed; James S. Pristelski; James W. Gillman

[57] ABSTRACT

A dual slope pulse width modulation regulator for separate control of two independently operative power supplies is provided. An oscillator supplies a triangle wave having a period T signal to each of two separate DC comparators each of which also receives an analog error signal related to the difference between a power supply output signal and a predetermined reference level. The outputs of the DC comparators are coupled to a pair of AND gates which are alternately enabled by a digital output signal of the oscillator with the digital output signal having output states corresponding to the duration of first and second rates of change of the triangle wave signal which occur during each period T. The outputs of the AND gates correspond to pulse width modulated drive signals which are utilized to control the excitation of independently operative power supplies having output sensor circuits which sample the output of the power supplies and result in providing the first and second analog error signals. During each period T separate, independently operative pulse width modulation power supply control signals are provided through the alternate use of the first and second rates of change of the triangle wave signal of the oscillator to provide pulse width modulation control signals.

10 Claims, 2 Drawing Figures

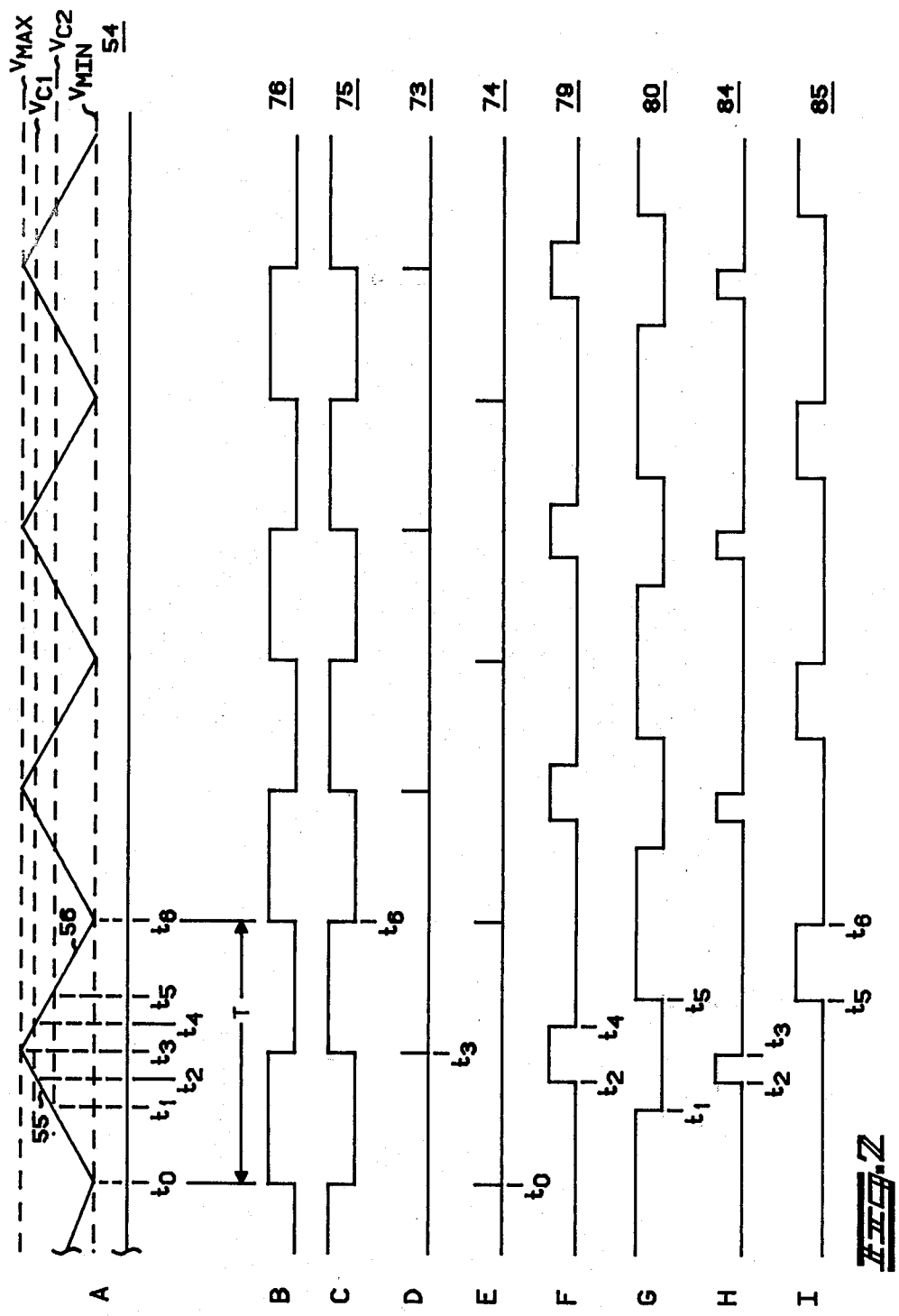

DUAL SLOPE PULSE WIDTH MODULATION REGULATOR AND CONTROL SYSTEM

BACKGROUND OF THE INVENTION

The present invention is related to the field of power supply regulators, and more specifically to the field of power supply regulators which control two or more independently operative power supplies by providing separate pulse width modulation control signals thereto.

Power supply control systems exist wherein a regulator controls a power supply output by creating a pulse width modulation control signal. Such power supply control systems are referred to as switchmode regulator controlled power supplies and custom integrated circuit control circuits for these power supplies exist, such as integrated circuit MC3420 manufactured by Motorola, Inc. and integrated circuit SG1524 manufactured by Signetics Corporation. Typically in such systems, a periodic, variable amplitude carrier signal is generated by a power supply control circuit and this variable amplitude carrier signal is subsequently utilized to provide a pulse width modulated signal that is used to control the excitation of a power supply. The output of the power supply is then sampled by a voltage or current sensing circuit, compared to a predetermined voltage or current reference level to create an analog error signal, and the error signal is utilized to control the amount of pulse width modulation to thereby maintain the output of the power supply at a constant desired level.

Typically, the periodic carrier signal provided by the switchmode regulator control circuit will have either a triangle or ramp waveshape having a period T, and the regulator will provide pulse width modulated, variable duration output control pulses and these pulses are used to control, and therefore regulate, the excitation of the power supply. Typically, a single pulse width modulated, variable duration drive pulse is provided during each period T and two output drive signals are derived therefrom each operative during alternate sequential periods T to provide power supply excitation control signals. Normally the two output drive signals are utilized to control a push-pull mode power supply drive circuit, but these drive signals can also be used to sequentially excite a single power supply drive device. In either event a single variable duration pulse produced by pulse width modulation techniques is produced for each period T and this signal is used to control the excitation, and therefore the output, of a power supply.

It has been previous proposed to utilize the pulse width regulator ramp carrier signal of the Signetics Corporation integrated circuit SG1524 to produce two control signals having alternately occurring but independent variable duration drive pulses for separate control of two independently operative power supplies. This is accomplished by providing two error signals, one related to the difference between a first power supply output and a first reference level and the other error signal related to the difference between a second power supply output and a second reference level. Each error signal is then utilized to provide a variable duration drive pulse, by use of pulse modulation techniques, wherein during each period T of the carrier signal a power supply drive pulse for either the first or the second power supply is produced. Thus, as was the case for providing the control signals for a single power supply, during each period T of the carrier wave only a single power supply drive signal pulse is provided, but now the control pulses provided in alternate periods T are used to control a first power supply while alternate periodic pulses provided between these first power supply pulses are used to control a second power supply. Thus the excitation control pulses for any one power supply have a period of 2T.

The above described structure does result in utilizing the same carrier signal for providing two independent pulse width modulation output drive signals that have alternately produced drive pulses. This insures that each of the drive signals produced for each power supply will occur sequentially and not simultaneously and this therefore reduces the amount of peak current for power supply energization that will have to be utilized at any one instant. However, the cost of standard power supply regulator circuits which provide a single variable duration drive pulse during each period T of the carrier signals is substantial, and this would therefore discourage the use of such circuitry for providing separately operative power supply regulation for two independently operative power supplies in a regulation system as described above. In addition, if two separately operative power supplies are to be controlled according to the above structure, the frequency of the carrier wave must be relatively high to insure proper operation of the regulator circuit since for each power supply a pulse width modulation drive pulse is provided only during alternate cycles of the carrier and if too much time elapses between power supply excitation pulses the output of the power supply may not be maintainable at a desired level with the use of relatively inexpensive power supply components, and use of too low of a frequency for the carrier wave can result in audible noise due to the magnetostrictive operation of transformers used in the power supply. The use of a too high of a frequency for the carrier signal to overcome the previously mentioned problems should be avoided since this may create design and power dissipation problems as well as possibly causing radiation of the high frequency carrier signal resulting in undesired noise.

SUMMARY OF THE INVENTION

An object of the present invention is to provide a pulse width modulation regulator which overcomes all of the above discussed deficiencies of prior art circuits.

A more specific object of the present invention is to provide a reduced cost pulse width modulation regulator which utilizes a relatively low frequency carrier signal while being adaptable for providing separate control of two independently operative power supplies.

In one embodiment of the present invention a dual slope pulse width modulation regulator, adaptable for separate control of two independently operative power supplies is provided. The pulse width modulation regulator comprises: means for receiving first and second analog error signals each of which is related to the difference between the output of first and second independently operative power supplies and first and second desired predetermined reference levels, respectively; oscillator means for providing a periodic carrier signal comprising a triangle wave output signal with a period T, said triangle wave signal having a magnitude and said triangle wave signal during each period T having its magnitude varying substantially linearly at a first predetermined rate and the varying substantially linearly at a second predetermined rate of opposite polarity than said first predetermined rate, said oscillator means also providing a corresponding digital output signal having the period T and having a first digital output state existing during said first predetermined rate and a second digital output state existing during said second predetermined rate; first and second comparator means both being coupled to the said oscillator means and each comparator means being coupled to said one of first and second receiving means, respectively, each of said first and second comparator means receiving one of said first and second analog error signals, respectively, along with said triangle wave signal as input signals and providing corresponding first and second digital output comparator signals in response thereto, each of said first and second comparator means providing its respective output comparator signal with one digital output state in response to one of its input signals exceeding the other and a different digital output state in response to the reverse condition; and first and second AND gate means both being coupled to said oscillator means and each being coupled to one of said first and second comparator means, respectively, each of said first and second AND gate means receiving one of said first and second digital output comparator signals, respectively, and one of said AND gate means effectively directly receiving said digital output signal of said oscillator means while the other of said AND gate means effectively receives a signal corresponding to the inverse of said oscillator means digital output signal, wherein each of said first and second digital comparator output signals comprises a pulse width modulated digital signal having pulse durations related to the magnitude of said first and second error signals, respectively, and wherein each of said AND gate means provides first and second pulse width modulated power supply control signals, respectively, each of said power supply control signals providing periodic controllable pulse width pulses adaptable for excitation of first and second independently operative power supplies, said controllable width pulses of said first and second power supply control signals alternately occurring during each period T and each occurring during said first and second predetermined rates of said triangle wave signal, respectively.

According to the above statement of the present invention during each period T of the oscillator means carrier signal, which comprises a triangle wave output signal, a pair of controllable width pulses is produced with one of these pulses being utilized to provide a first pulse width modulated power supply control signal and the other of these pulses corresponding to a second pulse width modulated power supply control signal with each of these control signals being utilized to effect separate control of separate independently operative power supplies. Each of the first and second control signal pulses occurs only during an associated one of the first and second rates of the carrier signal, respectively, and both first and second control signal pulses are alternately produced during each period T. Because of this, the present invention can utilize a carrier signal having a reduced frequency since for each period T each power supply to be controlled will have a pulse width modulated control signal provided, whereas the prior art provided a pulse width modulated control signal for any one of two separate operative power supplies to be controlled only during alternate periods T of the carrier signal.

In addition, preferably the present invention contemplates utilizing a standard 555 timer circuit as comprising the above defined oscillator means. These timer circuits are readily available as low cost integrated circuits such as integrated circuit MC1455 manufactured by Motorola Inc. Through the use of this standard and inexpensive integrated circuit the present invention provides a low cost pulse width modulation regulator that can readily control two independently operative power supplies and maintain the outputs of these power supplies at two desired predetermined reference levels.

Essentially, the present invention differs from the prior art in that the prior art provided a pulse width modulated drive signal for a switchmode power supply by alternately utilizing variable slope portions of a carrier signal wherein for each period T of the carrier signal a single pulse width modulated drive signal pulse was produced and routed to one power supply while during the next cycle T another pulse width modulated drive signal pulse was produced and routed to either the same power supply or a different power supply for control thereof. By way of contrast, the present invention provides for utilizing each of two rates of change of a triangle wave which occur during a period T to provide two separate pulse width modulated drive signal pulses during each period T. The present invention couples these two drive signal pulses to separately operative power supplies while insuring the sequential, rather than simultaneous, occurrence of these separate pulse width modulated drive signal pulses so as to minimize the instantaneous power requirements for the pulse width modulated regulator and power supply control system of the present invention.

The preferred embodiment of the present invention discribes the use of the present invention in the context of a voltage regulator in which power supplies are maintained at a constant voltage. However, the principles of the present invention are also applicable to the use of a pulse width modulation current regulator in which separate independently operative power supplies are regulated for maintaining constant current outputs.

BRIEF DESCRIPTION OF THE DRAWINGS

For a more complete understanding of the present invention reference should be made to the drawings in which:

FIG. 2 is a series of graphs A through I illustrating the waveforms of signals provided at various circuit terminals shown in FIG. 1.

DESCRIPTION OF THE PREFERRED EMBODIMENT

Figure 1:
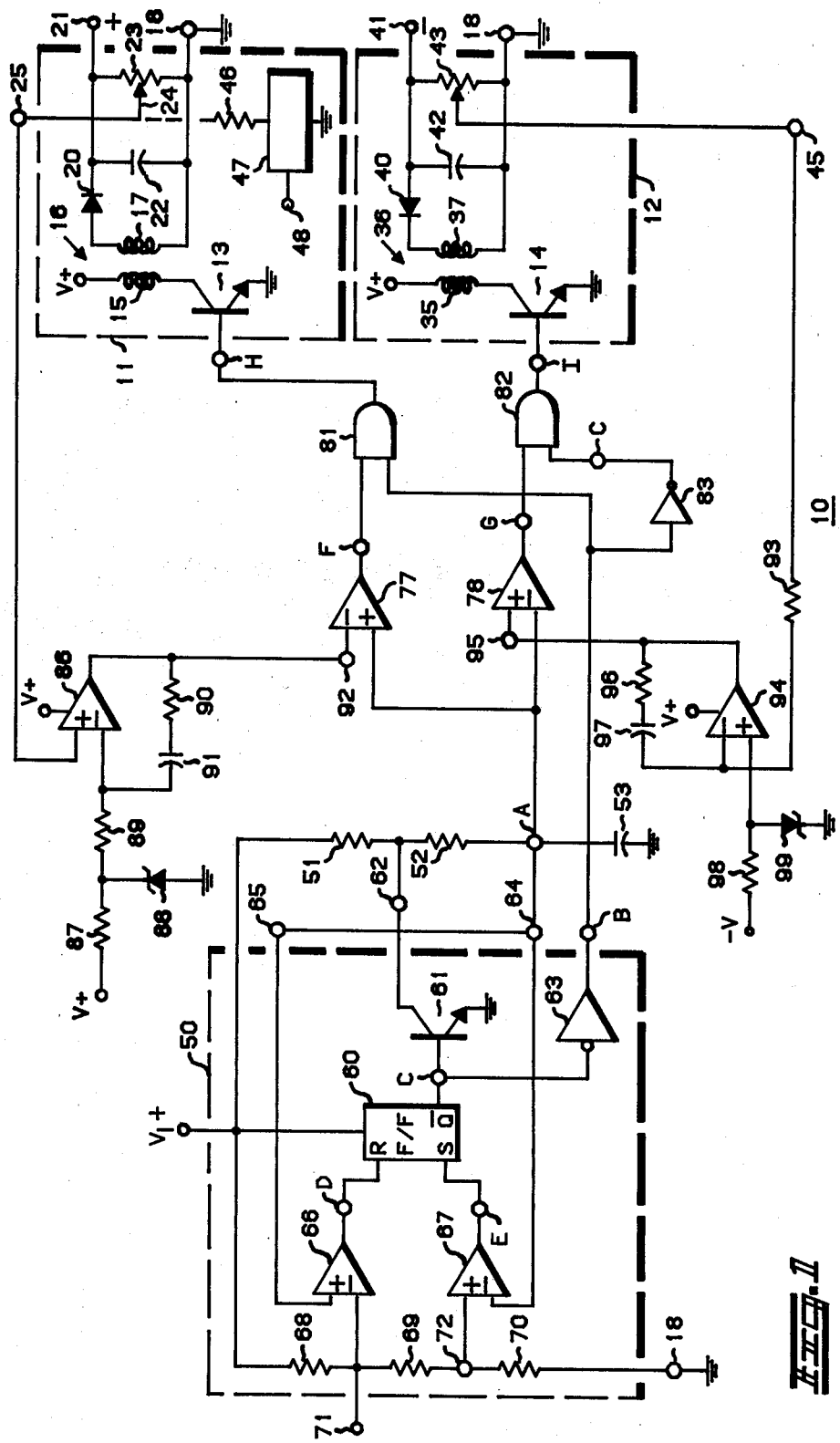
FIG. 1 is a schematic diagram illustrating a pulse width modulation voltage regulator utilized for controlling the output of two independently operative voltage power supplies.

Referring to FIG. 1, a dual slope pulse width modulation regulator and power supply control system 10 is illustrated. The control system 10 provides separate independent control for first and second independently operative voltage power supplies 11 and 12, respectively, shown dashed in FIG. 1. Each of the power supplies 11 and 12 receives pulse width modulated control signals and includes first and second separate control devices 13 and 14, respectively, which comprise NPN transistors and provide control excitation for each of the power supplies in response to the received control signals. The specific configuration for each of the voltage power supplies 11 and 12 will now be described in detail to provide an example of a typical power supply configuration suitable for either of the power supplies 11 or 12. While the present invention is described in terms of voltage power supplies having a specific configuration, the basic principles of the present invention are also applicable to current regulated power supplies as will be understood by those in the power supply design field.

With respect to the power supply 11, this power supply includes the control device transistor 13 which has its base directly coupled to a control terminal H, its emitter directly connected to ground and its collector connected through a primary winding 15 of a voltage step-up transformer 16 to a positive voltage supply terminal V+. A secondary winding 17 of the transformer 16 has one end thereof directly connected to a ground terminal 18 and another end connected to the anode of a rectifying diode 20 which has its cathode directly connected to a positive high voltage output terminal 21. The terminal 21 is connected to ground by an integrating capacitor 22 in parallel with the fixed series resistance element of a potentiometer 23 having an adjustable wiper arm 24 directly connected to a power supply output voltage sensing terminal 25. The components 13 through 25 basically comprise the first voltage power supply 11 and the second voltage power supply 12 is substantially identically constructed except that the polarity of the rectifying diode is reversed so that the high voltage output terminal of the second power supply 12 provides a negative voltage with respect to ground. The elements which comprise the second voltage power supply 12 are designated by reference numbers 35 through 45 which directly correspond to the elements 15 through 25 in the first voltage power supply 11. The second control transistor 14 has its base directly connected to a control terminal I, its emitter directly connected to ground and its collector connected to the primary winding 35 of a voltage step-up transformer 36.

Essentially each of the power supplies 11 and 12 is a switchmode power supply wherein the power supply output is controlled by the duration of the switching states of the control transistors 13 and 14, respectively. Each power supply functions by receiving a periodic pulse width modulated control signal at its associated control terminal, H or I, which results in the periodic turning on of the control transistors 13 and 14. This, in turn, results in applying periodic current excitation to the transformer primary windings which results in periodic high voltage output signals being provided by the transformers secondary windings since the secondary windings are contemplated as having many more turns than the associated primary windings. The rectifying diodes 20 and 40, in combination with the integrating capacitors 22 and 42 result in rectifying these high voltage signals to provide DC output voltages at the terminals 21 and 41 essentially in accordance with the duration of high voltage logic states provided at the terminals H and I for the pulse width modulation control signals provided thereat. Since the diodes 20 and 40 have opposite polarities with respect to their circuit connections, the DC voltage at the terminal 21 will be positive with respect to ground potential while the DC voltage at the terminal 41 will be negative with respect to ground potential.

It should be noted that the present invention contemplates that the duration during which the control transistors 13 and 14 are turned on will always be sufficiently short such that the transformers 16 and 36 will never become saturated and this will issure proper operation of the power supplies 11 and 12 so that the outputs of these power supplies will be controlled in accordance with the high logic state pulse width of the control signals provided at the terminals H and I. It should be noted that the specific configurations of the voltage power supplies 11 and 12 are described merely way of example and other voltage supply configurations, or current supply configurations, could be used for the power supplies 11 and 12.

The potentiometers 23 and 43 are essentially utilized as power supply sensing circuits which provide power supply output related signals at the terminals 25 and 45 that indicate the magnitude of the power supply output. The signals at the terminals 25 and 45 are then utilized by voltage regulator circuitry of the present invention to determine the pulse width modulation control signals at the terminals H and I so as to maintain the signal magnitude at the power supply output terminals 21 and 41 substantially constant at predetermined desired magnitude levels. The manner in which this is accomplished will subsequently be discussed in detail.

The potentiometers 23 and 43 are utilized to provide an adjustable reduced magnitude signal at the terminals 25 and 54 respectively, so as to provide output sensing signals related to the output of the power supplies 11 and 12. An optional circuit is illustrated in the power supply 11 as comprising a resistor 46 connected in series between the terminal 25 and a series controllable gate circuit 47 which is coupled to ground and receives a control input from a control terminal 48. Essentially in response to high or low logic states at the terminal 48, the gate circuit 47 will either ground one end of the resistor 46 or leave this end of the resistor open circuited. This essentially provides an adjustable electronically controlled circuit to alter the operation of the power supply 11 such that the power supply output can be maintained at either of two desired predetermined voltage levels in accordance with the control signals at the terminal 48. This because the gate circuit 47 when it grounds the resistor 46, will effectively alter the magnitude of the power supply output sensing signal provided at the terminal 25. This is an optional feature of the control system 10 shown in FIG. 1. Circuitry similar to the circuitry 46 through 48 can also be utilized in the power supply 12 if desired.

The manner in which the pulse width modulated control signals at the terminals H and I are produced in response to the power supply output voltage sensing signals at the terminals 25 and 45 will now be discussed in detail. It should be noted that the operation of the power supply control system 10 will be described with reference to the signal waveforms illustrated in graphs A through I in FIG. 2 wherein each of these graphs has a vertical axis represented of magnitude and a horizontal axis representative of time, with each of the graphs being drawn to the same horizontal time scale. It should also be noted that the signal waveforms in the graphs A through I correspond to the waveforms of signals provided at terminals A through I shown in FIG. 1, respectively.

The power supply control system 10 utilizes a standard "555" integrated circuit timer 50 (shown dashed) which is an inexpensive integrated circuit manufactured by a number of different manufacturers and readily available. An example of one such 555 timer circuit is the Motorola Inc. integrated circuit MC1455. The integrated circuit 50 in conjunction with external resistors 51 and 52 and an integrating capacitor 53 essentially form an oscillator means which provides a periodic carrier signal comprising a triangle wave output signal 54 having a predetermined constant period T. The signal 54 is provided at the terminal A and the waveform of this signal is illustrated in graph A in FIG. 2.

The signal 54, during each period T, has its magnitude varying substantially linearly at a first predetermined rate, represented by an increasing signal slope 55, and then varying substantially linearly at a second predetermined rate of opposite polarity than the first predetermined rate, the second predetermined rate represented by a decreasing signal slope 56. The signal 54 varies between a maximum magnitude level $V_{max}$ and a minimum magnitude level $V_{min}$. The triangle wave carrier signal 54 is utilized by additional circuitry to provide two independent pulse width modulated control signals at the terminals H and I for controlling the outputs of the power supplies 11 and 12. Before discussing the utilization of the carrier signal 54, the operation of the components 50 through 53 which result in the generation of the signal 54 will be discussed.

The 555 integrated timer circuit 50 is a very inexpensive integrated curcuit and essentially comprises a set-reset flip-flop circuit 60 which is coupled to a positive voltage supply terminal $V_1+$ at which some regulated DC reference voltage is maintained. The output of the flip-flop circuit 60 is designated as $\overline{Q}$ and this is directly connected to a terminal C which corresponds to the base of an NPN transistor 61 which has its emitter connected to ground and its collector connected to a terminal 62 external to the integrated circuit 50. The terminal C is also coupled through a signal inverter stage 63 to a terminal B external to the integrated circuit 50. The positive voltage supply terminal $V_1+$ is connected through the resistor 51 to the terminal 62, and the resistor 52 is connected between the terminal 62 and the terminal A which is connected to ground through the integrating capacitor 53.

The terminal A is directly connected to, and therefore corresponds to, an external output terminal 64 of the integrated circuit 50 which is directly connected to another external terminal 65 of the integrated circuit. The terminal 65 is connected to the non-inverting input terminal of a DC comparator 66 included in the integrated circuit 50, while the terminal 65 is connected to the inverting input terminal of a DC comparator 67 also included within the integrated circuit 50. The output of the DC comparator 66 is provided at a terminal D that is directly connected to the reset input R of the flip-flop circuit 60 while the output of the comparator 67 is provided at a terminal E that is directly connected to the set input S of the flip-flop circuit 60. A string of internal series connected resistors 68, 69 and 70 is connected between $V_1+$ and ground potential at the terminal 18 with the resistor 68 being connected between the V+ terminal and a terminal 71 directly connected, as an input, to the inverting input terminal of the comparator 66. The resistor 69 is connected between the terminal 71, which is external to the integrated circuit 50, and an internal terminal 72 that is directly connected to the non-inverting input of the comparator 67. The resistor 70 is connected between the terminal 72 and the ground terminal 18.

The operation of the oscillator means of the present invention comprising the integrated timer circuit 50 and the external components 51 through 53 will now be explained in detail in conjunction with the signal waveforms illustrated in FIG. 2. It should be noted that the signal waveforms shown in FIG. 2 are illustrated for the condition that the magnitude of the resistor 51 is substantially smaller than the magnitude of the resistor 52 wherein this results in the approximate equality, in magnitude and duration, of the increasing and decreasing signal slopes 55 and 56.

Initially, at time $t_0$ the voltage at the terminal A will increase due to the charging of the capacitor 53 by the positive voltage supply $V_1+$ through the series resistors 51 and 52. This continues until a predetermined maximum voltage $V_{max}$ is attained wherein this voltage is represented by a constant DC voltage provided at the terminal 71 by the resistor divider comprising the resistors 68 through 70. When the voltage at the terminal A equals this maximum voltage, the comparator 66 will provide a positive impulse at the terminal D resulting in the resetting of the flip-flop circuit 60. The signal at the terminal D is designated by the reference number 73 and is illustrated in graph D of FIG. 2. The impulses provided at the terminal D will occur at predetermined times $t_3$ during each period T of the signal 54. In response to the resetting of the flip-flop circuit 60, a high logic state will be provided at the terminal C which will result in turning on the transistor 61 and discharging the capacitor 53 to ground through the resistor 52. This will continue until the voltage at the terminal A is decreased such that it now equals a minimum magnitude $V_{min}$ which corresponds to the constant DC voltage maintained at the terminal 72 by the voltage divider created by the resistors 68 through 70. At this time an impulse will be created at the terminal E by the comparator 67 resulting in the setting of the flip-flop circuit 60, the creation of a low voltage state at the terminal C and the turning off of the transistor 61. This effectively reinitiates the charging cycle for the capacitor 53 and results in the start of another period T of the signal 54.

The signal provided at the terminal E is designated by the reference number 74 and comprises impulses which occur at the times $t_0$ and $t_6$ wherein these times represent the beginning and ending of one period T of the signal 54. The signal provided at the terminal C is designated by the reference number 75 and corresponds to a digital output signal representive of the output of the flip-flop circuit 60 wherein the signal 75 has a low digital output state to existing during the increasing signal slope 55 of the signal 54 and a high digital output state existing during the decreasing signal slope 56. The signal at the terminal B is designated by the reference number 76 and merely corresponds to the inverse of the signal 75. It should be noted that the impulses which occur in the signal 73 correspond to the occurrence of a change of slope for the signal 54 at the times of maximum magnitude whereas the impulses which occur in the signal 74 correspond to a change of slope of the signal 54 at times of minimum magnitude of this signal.

From the above description of the operation of the components 50 through 53, it is clear that the present invention provides an oscillator which produces a triangle wave output signal 54 and a corresponding digital output signal 76 having digital output states related to the existence of increasing or decreasing signal slopes of the signal 54. The present invention concerns the use of the signals 54 and 76 provided by the components 50 through 53 to provide two separate and independent power supply control signals for implementing the separate and independent control of two power supplies wherein this is accomplish by providing independent periodic pulse width modulation control signals for each of the power supplies 11 and 12 wherein these control signals have the same period T as the signal 54 and wherein pulses in the periodic control signals are alternately produced so as to prevent each of the power supplies 11 and 12 from simultaneously drawing current from the positive voltage supply terminal V+. The manner in which this is accomplished will now be discussed.

The terminal A is directly connected to a non-inverting input terminal of a first DC comparator 77 and to the inverting input terminal of a second DC comparator 78. Essentially each of the DC comparators receives two input signals and provides an associated output comparator signal having one digital output state in response to one of its input signals exceeding the other and a different digital output state in response to the reverse condition.

The outputs of the DC comparators 77 and 78 are provided at terminals F and G, respectively, and result in signals 79 and 80 illustrated in graphs F and G in FIG. 2, respectively. The terminals F and G are connected as inputs to first and second AND gates 81 and 82, respectively, with AND gate 81 receiving another input by virtue of a direct connection to terminal B and AND gate 82 receiving another input through the coupling of terminal B to the AND gate 82 through an inverter stage 83. It should be noted that since the signal 76 at the terminal B is the inverse of the signal 75 at the terminal C provided as the output of the flip-flop circuit 60, the actual signal provided as an input to the AND gate 82 will also correspond to the signal 75 due to the action of the inverter stage 83. The first AND gate 81 provides an output that is directly connected to the power supply control terminal H and results in providing at this terminal a pulse width modulated power supply control signal 84, illustrated in graph H of FIG. 2. Similarly, the output of the AND gate 82 is directly connected to the terminal I and results in providing at this terminal a pulse width modulated signal 85, illustrated in graph I of FIG. 2.

As was noted previously, voltage sensing circuitry senses the output magnitudes of the power supplies 11 and 12 and provides representative signals at the terminals 25 and 45, respectively. The terminal 25 is directly connected to the non-inverting input terminal of an analog error signal amplifier 86 which receives the analog power supply output related signal at the terminal 25 and compares this signal with a predetermined reference level which is in the form of a fixed DC voltage applied to the inverting input terminal of the amplifier 86. The fixed DC reference voltage applied to the inverting terminal of the analog error signal amplifier 86 is provided by a resistor 87 connected between the V+ terminal and the cathode of a zener diode 88 having its anode directly connected to ground. The voltage at the cathode of the zener diode 88 is coupled through a resistor 89 to the inverting input terminal of the error signal amplifier 86. A negative AC feedback path is provided by a resistor 90 and a capacitor 91 connected in series between the output of the error signal amplifier 86 and its inverting input wherein these elements provide AC gain stability for the amplifier 86. The output of the amplifier 86 is provided at an output receiving terminal 92 which is directly connected to the inverting input terminal of the first comparator 77.

Essentially, an analog signal representative of the output of the power supply 11 is provided at the terminal 25. The analog error signal amplifier 86 compares this output related signal with a fixed DC reference level voltage provided by the zener diode 88 and provides an analog difference error signal to the receiving terminal 92. This analog difference error signal is illustrated in graph A of FIG. 2 as comprising the reference voltage level $V_{C1}$. Since the comparator 77 receives this signal $V_{C1}$ at its inverting input terminal and receives the triangle wave signal 54 at its non-inverting input terminal, the comparator output signal 79 provided at the terminal F comprises a series of periodic pulses, having a period T, which commence at the times $t_2$ when the signal 54 exceeds the difference signal $V_{C1}$ and terminate at the times $t_4$ when the signal 54 falls below the difference signal $V_{C1}$. Thus the signal 79 provided by the first comparator 77 provides a first digital output comparator signal 79 having positive output states corresponding to when the triangle wave signal 54 exceeds the analog error signal $V_{C1}$ provided at the terminal 92.

The circuit connections provided for utilization of the analog signal at the terminal 45 related to the output of the power supply 12 are substantially similar to those described above dealing with the utilization of the signal at the terminal 25. The terminal 45 is connected through a resistor 93 to the inverting input terminal of a second analog error signal amplifier 94 which has its output directly connected to a receiving terminal 95 that is directly connected to the non-inverting input terminal of the second comparator 78. A series connected resistor 96 and capacitor 97 are connected between the inverting input terminal of the error signal amplifier 94 and its output to provide AC gain stability. A negative fixed DC reference level voltage is provided to the non-inverting input terminal of the error signal amplifier 94 by means of a resistor 98 coupled between a terminal V− having a source of negative power supply potential and the anode of a zener diode 99. The anode of diode 99 is directly connected to the non-inverting input terminal of the amplifier 94 and the diode 99 has its cathode directly connected to ground.

Essentially, the second analog error signal amplifier 94 receives the signal at the terminal 45 related to the output of the power supply 12, compares this signal with a negative fixed DC reference voltage provided by the zener diode 99 and provides an analog output control error signal at the terminal 95 related to the difference between the input signals received by the amplifier 94. The analog error signal provided at the terminal 95 is illustrated in graph A of FIG. 2 as the reference voltage level $V_{C2}$. The DC comparator 78 compares this signal $V_{C2}$ with the triangle wave output signal 54 and provides in response thereto at its output terminal G the digital pulse width modulated signal 80 illustrated in graph G of FIG. 2. The signal 80 provides a low logic state at the time $t_1$ in response to magnitude of the signal 54 exceeding the reference level $V_{C2}$, and provides a high logic state at time $t_5$ representative of the reverse condition.

In effect, the signals 79 and 80 at the terminals F and G represent pulse width modulated control signals each having a period T wherein the duration of the high logic state of these signals are related to the magnitudes of the error output signals of the first and second error signal amplifiers 86 and 94, respectively. The problem with directly utilizing the signals at the terminals F and G to control the excitation of the control transistors 13 and 14 is that in some circumstances, such as having the analog error signal level $V_{C1}$ being less than the analog error signal level $V_{C2}$, the high logic states of the signals 79 and 80 may overlap. This is because theoretically the duration of the high logic state of either of the signals 79 and 80 can occur for any duration up to the maximum duration of T which is the time that exists between the time $t_0$ (at which one impulse of the signal 74 will occur) and the time $t_6$ (which is when the next impulse of the signal 74 occurs). If the high logic states of the drive signals used to drive the transistors 13 and 14 do overlap, this will result in the simultaneous energization of both primary transformer windings 15 and 35. The end result is requiring the power supply which supplies the voltage at the terminal V+ to be capable of providing a peak current sufficient to accommodate the simultaneous energization of both primary windings. This is undesirable and the present invention avoids this requirement through the use of the AND gates 81 and 82 in conjunction with the digital output signal 76. This is accomplished in the following manner.

The signals 79 and 80 at the terminals F and G are provided as inputs to the first and second AND gates 81 and 82, respectively. The AND gates 81 and 82 also receive either non-inverted or inverted versions of the signal 76 which results in the effective alternate enablement of the gates 81 and 82 by the signal 76. Due to these connections, the resultant power supply control signals 84 and 85 are provided at the terminals H and I, respectively. The signal 84 has high voltage logic states which commence at the times $t_2$ and terminate at the times $t_3$, whereas the signal 85 produced at the terminal I has high voltage logic states which commence at the times $t_5$ and terminate at the times $t_6$. Because of the gating function performed by the AND gates 81 and 82, the pulse width modulated power supply control signals 84 and 85 cannot overlap so as to provide simultaneous energization of the primary transformer windings. This is because the high voltage logic states for the signal 84 can exist only from the times $t_0$ to the times $t_3$ whereas the high logic states for the control signal 85 can exist only between the times $t_3$ and the times $t_6$. This avoids the possibility of simultaneous energization of both of the primary transformer windings. This also insures that excitation will not be continuously applied to either of the primary windings 15 or 35, regardless of the magnitude of the outputs of the power supplies 11 and 12. This feature aids in designing the system 10 to prevent saturation of the transformers 16 and 36.

The present invention, besides avoiding simultaneous energization of the primary transformer windings, accomplishes this by developing pulse width modulated power supply control signals 84 and 85 each of which has the same period T as the triangle wave carrier signal 54. This is accomplished by developing controllable width excitation pulses for the transformer windings for the power supply control signals 84 and 85 alternately during each period T of the carrier signal 54 wherein the excitation pulses of the first and second control signals 84 and 85 each occur during the duration of the first and second predetermined signal slopes 55 and 56, respectively, of the carrier signal 54.

The end result is that the present invention utilizes a carrier signal having a period T to provide pulse width modulated control signals 84 and 85 which independently control separate power supplies 11 and 12 while each of the control signals 84 and 85 has the same period T as the carrier signal 54 and while simultaneous excitation of the power supplies 11 and 12 is prevented by gating circuitry. All of this is accomplished with the utilization of the inexpensive 555 timer integrated circuit 50.

Prior power supply regulator circuits have either disregarded the consequences of simultaneous excitation of two independently controlled power supplies or have utilized a carrier signal having period T to provide separate pulse width modulation control signals for two independent power supplies wherein these control signals have periods of 2T. By extending the period of the pulse width modulation control signal for a power supply, the prior power supply circuits were forced to utilize higher frequency carrier signals, which might prove undesirable in many instances, or the prior circuits were forced to compromise desired regulation characteristics for the power supplies due to the slower repetition rate of the power supply control signals. These problems are overcome by the present invention in which the repetition rate of the power supply control signals is identical to that of the carrier signal which creates the pulse width modulation control signals. In addition, many prior art regulator circuits use expensive custom voltage regulator circuits which are many times the cost of the inexpensive 555 timer integrated circuit utilized by the present invention.

While I have shown and described a specific embodiment of the present invention, further modifications and improvements will occur to those skilled in the art. As already previously noted, such modifications can comprise the utilization of current power supply regulation rather voltage power supply regulation as described herein. All such modifications which retain the basic underlying principles disclosed and claimed herein are within the scope of this invention.

I claim:

1. A dual slope pulse width modulation regulator, adaptable for separate control of two independently operative power supplies, comprising:

means for receiving first and second analog error signals each of which being related to the difference between the output of first and second independently operative power supplies and first and second desired predetermined reference levels, respectively;

oscillator means for providing a periodic carrier signal comprising a triangle wave output signal with a period T, said triangle wave signal having a magnitude and said triangle wave signal during each period T having its magnitude varying substantially linearly at a first predetermined rate and then varying substantially linearly at a second predetermined rate of opposite polarity than said first predetermined rate, said oscillator means also providing a corresponding digital output signal having the period T and having a first digital output state existing during said first predetermined rate and a second digital output state existing during said second predetermined rate;

first and second comparator means both being coupled to said oscillator means and each comparator means being coupled to one of said first and second receiving means, respectively, each of said first and second comparator means receiving one of said first and second analog error signals, respectively, along with said triangle wave signal as input signals and providing corresponding first and second digital output comparator signals in response thereto, each of said first and second comparator means providing its respective output comparator signal with one digital output state in response to one of its input signals exceeding the other and a different digital output state in response to the reverse condition; and first and second AND gate means both being coupled to said oscillator means and each being coupled to one of said first and second comparator means, respectively, each of said first and second AND gate means receiving one of said first and second digital output comparator signals, respectively, and one of said AND gate means effectively directly receiving said digital output signal of said oscillator means while the other of said AND gate means effectively receives a signal corresponding to the inverse of said oscillator means digital output signal, wherein each of said first and second digital comparator output signals comprises a pulse width modulated digital signal having pulse durations related to the magnitude of said first and second error signals, respectively, and wherein each of said AND gate means provides first and second pulse width modulated power supply control signals, respectively, each of said power supply control signals providing periodic controllable width pulses adaptable for excitation of first and second independently operative power supplies, said controllable width pulses of said first and second power supply control signals alternately occurring during each period T and each occurring during said first and second predetermined rates of said triangle wave signal, respectively.

2. A dual slope pulse width modulation regulator according to claim 1 wherein said oscillator means includes a flip-flop circuit, a capacitor and a charging/discharging circuit, said flip-flop circuit being alternately set and reset in accordance with the magnitude of a signal provided by the alternate charging and discharging of said capacitor.

3. A dual slope pulse width modulation regulator according to claim 2 wherein said oscillator means includes a 555 timer circuit that comprises said flip-flop circuit and provides said digital output signal for controlling the alternate charging and discharging of said capacitor.

4. A dual slope pulse width modulation regulator according to any one of claims 1, 2 or 3 which includes first and second analog error signal producing means, each including an analog error signal amplifier which receives a signal related to the magnitude of a power supply output, compares this received signal with a predetermined reference level, and provides an analog output control signal in accordance with the difference between its received input signals.

5. A dual slope pulse width modulation regulator according to claim 4 wherein at least one of said predetermined reference levels corresponds to a fixed reference level.

6. A dual slope width modulation regulator according to claim 4 which includes first and second separate control devices and wherein each of said first and second pulse width modulated power suply control signals of said first and second AND gate means are coupled to said first and second separate control devices, respectively, which provide as outputs control excitation for at least two separate power supplies.

7. A dual slope pulse width modulation regulator according to claim 6 which includes first and second regulated power supplies which are coupled to and receive pulse width modulated control excitation from said first and second devices, respectively, and provide regulated outputs in response thereto, said first and second power supplies including first and second sensing circuits, respectively, which provide input signals to said first and second analog error signal amplifiers, respectively.

8. A dual slope pulse width modulation regulator according to claim 7 wherein said oscillator means digital output signal is connected directly as an input to one of said first and second AND gate means and is connected through an inverter stage as an inverted input to the other of said first and second AND gate means.

9. A dual slope pulse width modulation regulator according to claim 1 wherein said oscillator means digital output signal is connected directly as an input to one of said first and second AND gate means and is connected through an inverter stage as an inverted input to the other of said first and second AND gate means.

10. A dual slope pulse width modulated regulator and control system for two independently operative power supplies comprising:

means for receiving first and second analog error signals each of which being related to the difference between the output of first and second independently operative power supplies and first and second desired predetermined reference levels, respectively;

oscillator means for providing a periodic carrier signal comprising a triangle wave output signal with a period T, said triangle wave signal having a magnitude and said triangle wave signal during each period T having its magnitude varying substantially linearly at a first predetermined rate and then varying substantially linearly at a second predetermined rate of opposite polarity than said first predetermined rate, said oscillator means also providing a corresponding digital output signal having the period T and having a first digital output state existing during said first predetermined rate and a second digital output state existing during said second predetermined rate;

first and second comparator means both being coupled to said oscillator means and each comparator means being coupled to one of said first and second receiving means, respectively, each of said first and second comparator means receiving one of said first and second analog error signals, respectively, along with said triangle wave signal as input signals and providing corresponding first and second digital output comparator signals in response thereto, each of said first and second comparator means providing its respective output comparator signal with one digital output state in response to one of its input signals exceeding the other and a different digital output state in response to the reverse condition; and first and second AND gate means both being coupled to said oscillator means and each being coupled to one of said first and second comparator means, respectively, each of said first and second AND gate means receiving one of said first and second digital output comparator signals, respectively, and one of said AND gate means effectively directly receiving said digital output signal of said oscillator means while the other of said AND gate means effectively receives a signal corresponding to the inverse of said oscillator means digital output signal, wherein each of said first and second digital comparator output signals comprises a pulse width modulated digital signal having pulse durations related to the magnitude of said first and second error signals, respectively, and wherein each of said AND gate means provides first and second pulse width modulated power supply control signals, respectively, each of said power supply control signals providing periodic controllable width pulses adaptable for excitation of first and second independently operative power supplies, said controllable width pulses of said first and second power supply control signals alternately occurring during each period T and each occurring during said first and second predetermined rates of said triangle wave signal, respectively; and first and second regulated power supplies which are coupled to and receive said first and second pulse width modulated power supply control signals from said first and second AND gate means, respectively, and provide regulated outputs in response thereto to first and second output sensing circuits which provide said first and second analog error signals, respectively, to said receiving means.

* * * * *